(12) United States Patent
Hutchins et al.

(10) Patent No.: US 8,207,094 B2
(45) Date of Patent: Jun. 26, 2012

(54) WELLBORE TREATMENT COMPOSITIONS CONTAINING FOAM EXTENDERS AND METHODS OF USE THEREOF

(75) Inventors: Richard D. Hutchins, Sugar Land, TX (US); Ann M. W. Hoefer, Houston, TX (US); Stanley B. McConnell, Katy, TX (US); Alejandro Pena, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/169,303

(22) Filed: Jul. 8, 2008

(65) Prior Publication Data

US 2008/0269080 A1 Oct. 30, 2008

(51) Int. Cl.
*C09K 8/60* (2006.01)
(52) U.S. Cl. ........ 507/235; 507/202; 507/211; 507/215; 507/216; 507/217; 507/219; 507/240; 507/241; 507/245; 507/271; 507/273; 507/276; 166/309
(58) Field of Classification Search .................. None
See application file for complete search history.

(56) References Cited

U.S. PATENT DOCUMENTS

| | | | |
|---|---|---|---|
| 3,937,283 A | 2/1976 | Blauer et al. | |
| 4,522,261 A | 6/1985 | McInerney et al. | |
| 4,941,533 A | 7/1990 | Buller et al. | |
| 5,385,206 A | 1/1995 | Thomas | |
| 5,551,516 A | 9/1996 | Norman et al. | |
| 5,990,052 A | 11/1999 | Harris | |
| 6,227,295 B1 * | 5/2001 | Mitchell et al. | 166/300 |
| 6,258,757 B1 * | 7/2001 | Sweatman et al. | 507/219 |
| 6,286,601 B1 | 9/2001 | Argillier et al. | |
| 6,435,277 B1 | 8/2002 | Qu et al. | |
| 6,703,352 B2 | 3/2004 | Dahayanake et al. | |
| 6,881,709 B2 | 4/2005 | Nelson et al. | |
| 2004/0110643 A1 | 6/2004 | Zevallos | |
| 2005/0026803 A1 | 2/2005 | Sivik et al. | |
| 2005/0124525 A1 | 6/2005 | Hartshorne et al. | |
| 2005/0164898 A1 | 7/2005 | Kasturi et al. | |

FOREIGN PATENT DOCUMENTS

| | | |
|---|---|---|
| EP | 0239132 | 4/1992 |
| RU | 2187533 C2 | 8/2002 |
| SU | 1208192 A | 1/1986 |
| WO | 03048267 A1 | 6/2003 |

OTHER PUBLICATIONS

SPE 80242—Hutchins, R.D. and Miller, M.J.—A Circulating Foam Loop for Evaluating Foam at Conditions of Use. Nov. 2005 SPE Production & Facilities, pp. 286-294.
PCT/IB2006/052813, international Filing Date Aug. 15, 2006, International Search Report dated Mar. 2, 2007.
Application No. 2008110038, Decision to Grant dated Jul. 19, 2010.

* cited by examiner

*Primary Examiner* — John J Figueroa
(74) *Attorney, Agent, or Firm* — Robin Nava; Daryl Wright; Jeremy Tillman

(57) ABSTRACT

This invention relates to fluid compositions used in treating a subterranean formation. In particular, the invention is aqueous wellbore treatment compositions which are foams containing a viscosifying agent, a foam extender, a gas component, and a surfactant, as well as methods of forming such fluids, and uses thereof. The viscosifying agent may be a hydratable polymer, viscoelastic surfactant, or heteropolysaccharide. The foam extender may be a material such as a polyoxyalkyleneamines, ethylenepolyamines, tertiary polyamines, bicarbonate, carbonate, phosphate, or sesquicarbonate.

18 Claims, 5 Drawing Sheets

WELLBORE TREATMENT COMPOSITIONS CONTAINING FOAM EXTENDERS AND METHODS OF USE THEREOF

BACKGROUND OF THE INVENTION

This invention relates to fluid compositions used in treating a subterranean formation. In particular, the invention is aqueous wellbore treatment compositions which are foams containing a viscosifying agent, a foam extender, a gas component, and a surfactant, as well as methods of forming such fluids, and uses thereof.

Various types of compositions are used in operations related to the development and completion of wells that penetrate subterranean formations, and to the production of gaseous and liquid hydrocarbons from natural reservoirs into such wells. These operations include perforating subterranean formations, fracturing subterranean formations, modifying the permeability of subterranean formations, or controlling the production of sand or water from subterranean formations. The compositions employed in these oilfield operations are commonly known as drilling fluids, completion fluids, work-over fluids, packer fluids, fracturing fluids, stimulation fluids, conformance or permeability control fluids, consolidation fluids, clean-out fluids, and the like.

These compositions often incorporate a gas component, such as air, nitrogen or carbon dioxide, to form a foam, energized fluid, or emulsion for treating the subterranean formations. It is desirable for these compositions to exhibit adequate viscosity and stability to perform the treatment, for example, to suspend and carry proppant into the fracture zone during a fracturing operation.

It is commonly known that stabilizing energized fluids or foams with viscosity properties suitable for oilfield operations become increasingly difficult to achieve at elevated formation temperatures, thus requiring higher levels of polymer or surfactant viscosifying agents. The matter is worsened when a gas such as carbon dioxide is present in the gas phase, since carbon dioxide exhibits high solubility in aqueous solutions. Subsequently, the carbon dioxide reacts with water to form carbonic acid, which may in turn reduce the effectiveness of metal crosslinking ions. Also, exposure to carbon dioxide at high temperatures promotes degradation of the polymeric chains, thus contributing to the referred loss of foam stability and viscosity. Further, it is commonly believed that the acidic effect of carbon dioxide cannot be overcome.

The viscosity of the compositions in which the gas component is dispersed may also affect the resulting viscosity and stability of the foam or energized fluid. In general, foams are more stable and viscous as the viscosity of the base fluid increases. Viscosifying agents such as viscoelastic surfactants and high molecular weight polymers are often added to increase the viscosity of the base fluid. However, a detriment of increasing the viscosifying agent content is a corresponding decrease in the retained conductivity of the formation after the treatment, as well as reduced clean-up, thus affecting well productivity negatively. Increased levels of viscosifying agent also lead to increased resource and material requirements.

The need to identify suitable chemicals to formulate viscous foams which provide improved retained conductivity, stability, and viscosity properties is known to those skilled in the art. A fluid that can achieve the above would be highly desirable, and these needs are met at least in part by the following invention.

SUMMARY OF THE INVENTION

In one aspect the invention provides wellbore treatment compositions useful for treating a subterranean formation. In particular, the invention is aqueous wellbore treatment compositions which are foams containing a viscosifying agent, a foam extender, a gas component, and a surfactant. Methods of forming such foams, and uses thereof are also disclosed.

Foam compositions according to the invention include an aqueous medium, a viscosifying agent, which may be a hydratable polymer, crosslinked hydratable polymer, or viscoelastic surfactant, a foam extender, gas, and a surfactant to form the foam. The foam extender is a material which effectively stabilizes the foam over operational time periods. The foam extender may also increase the viscosity of the foam, or correspondingly decrease the required level of viscosifying agent. Also, foam compositions according to the invention may be used without an acid additive.

Some viscosifying agents useful in forming the foam compositions include hydratable polymers, crosslinked hydratable polymers, heteropolysaccharides, crosslinked heteropolysaccharides, or viscoelastic surfactants. When a crosslinker is incorporated, examples of suitable crosslinkers include chemical compounds containing a polyvalent metal ion or specific organic functionalities. Examples of polyvalent metal ion crosslinkers include, but are not necessarily limited to, chromium, iron, boron, aluminum, titanium, and zirconium. Examples of organic crosslinkers include, but are not necessarily limited to, aldehydes, dialdehydes, phenolic-aldehyde compositions, multifunctional amines and imines.

The foam compositions disclosed may comprise a foam extender which may be sodium bicarbonate, sodium carbonate, sodium sesquicarbonate, potassium carbonate, potassium bicarbonate, potassium peroxycarbonate, ammonium carbonate, ammonium bicarbonate, trisodium phosphate, disodium hydrogen phosphate, sodium pyrophosphate, potassium pyrophosphate, ammonium pyrophosphate, sodium meta phosphate, potassium meta phosphate, ammonium meta phosphate, pyrodisodium phosphate, tripotassium phosphate, dipotassium hydrogen phosphate, diammonium hydrogen phosphate, trilithium phosphate, polyoxyalkyleneamines with at least two amino groups in their structure, ethylenepolyamines, tertiary polyamines, substituted propylamines, piperazines, and any mixtures thereof.

The gas component may be any gas effective for forming the foam. Carbon dioxide and nitrogen are particularly useful gases. The foam compositions may also include a proppant such as sand, walnut shells, sintered bauxite, glass beads, ceramic materials, naturally occurring materials, or any mixtures thereof.

BRIEF DESCRIPTION OF THE DRAWINGS

The invention may be understood by reference to the following description taken in conjunction with the accompanying drawings.

DETAILED DESCRIPTION OF THE PREFERRED EMBODIMENTS

Figure 1:
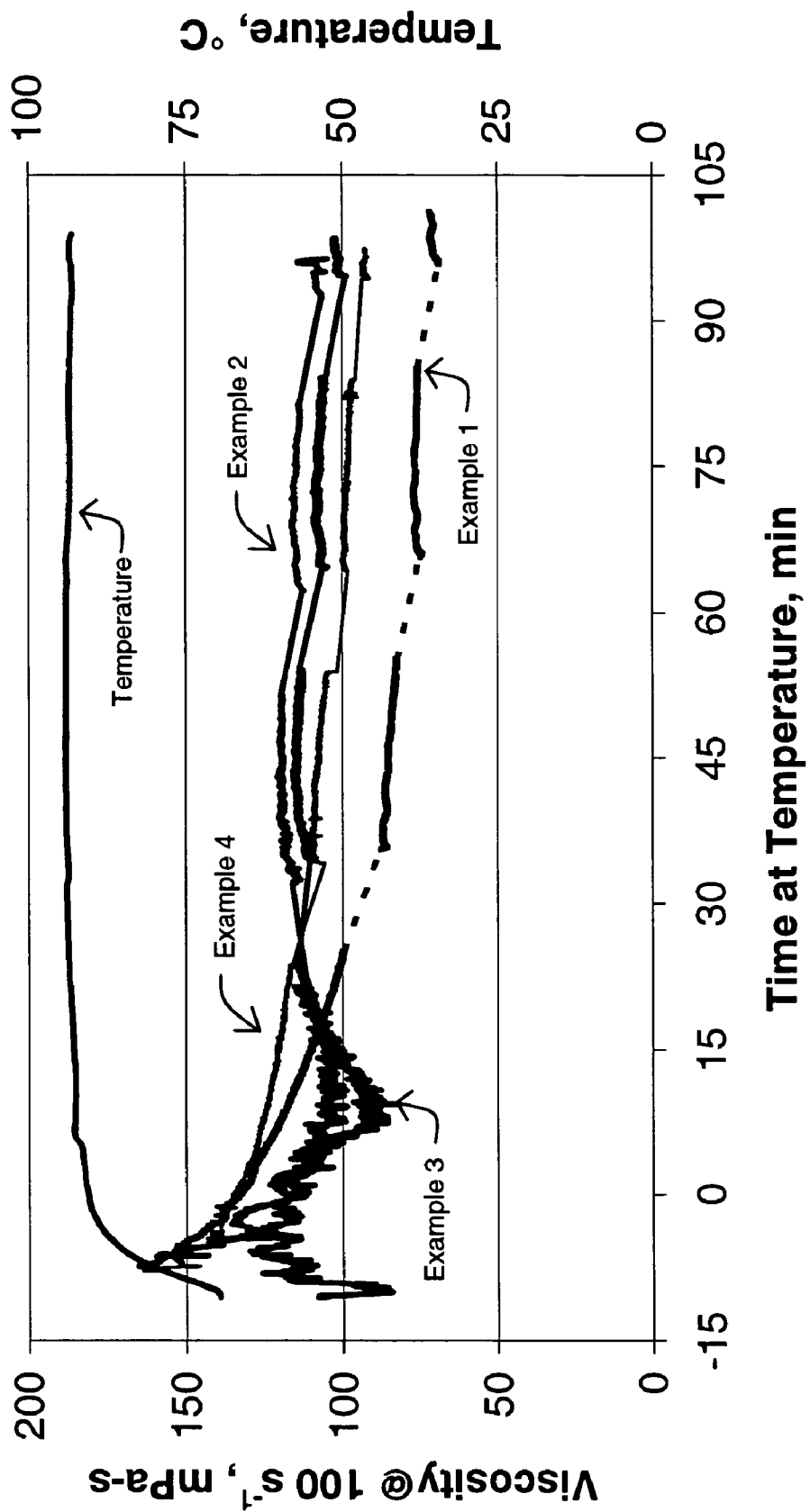
FIG. 1 and FIG. 2 by graphical representation illustrate the viscosity enhancing benefit of adding foam extenders to carbon dioxide based foams.

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context.

The invention provides wellbore treatment compositions useful for treating a subterranean formation. In particular, the invention is aqueous wellbore treatment compositions which are foams containing a viscosifying agent, a foam extender, a gas component, and a surfactant, methods of forming such foams, and uses thereof. The compositions may be formed and applied by injecting an aqueous well treatment fluid concomitantly with a gas (most commonly nitrogen, carbon dioxide, air or their mixtures). The dispersion of the gas into the base fluid in the form of bubbles increases the viscosity of such fluid and impacts positively its treatment performance, for example, its ability to effectively induce hydraulic fracturing of the formation, and also its capacity to carry solids, such as proppants that are placed within the fractures to create pathways through which oil, gas or brine can be further produced. The presence of the gas also enhances the flowback of the base fluid from the interstices of the formation and of the proppant pack into the wellbore, due to the expansion of such gas once the pressure is reduced at the wellhead at the end of the fracturing operation.

As used herein, the term "liquid phase" is meant to include all components of the composition except the gas phase. The term "gas" is used herein to describe any component in a gaseous state or in a supercritical state, wherein the gaseous state refers to any state for which the temperature of the composition is below its critical temperature and the pressure of the composition is below its vapor pressure, and the supercritical state refers to any state for which the temperature of the composition is above its critical temperature. The terms "foam", "energized fluid", and "fluid" are used interchangeably to describe any relatively stable mixture of gas phase and liquid phase, notwithstanding the foam quality value, i.e. the ratio of gas volume to the total volume of gas and liquid phases. Compositions according to the invention may be any suitable foam quality. For some foams, such as nitrogen base foams, the quality can be as high as 90%, or higher. Since gas volume is known to decrease substantially with applied pressure and increase moderately with applied temperature, the resulting foam quality will also depend upon the temperature and pressure of the foam composition. If the foam quality is above 52%, the fluid is conventionally called foam, and below 52%, an energized fluid. However, as used herein the term "foam" is defined as any stable mixture of gas and liquid, notwithstanding the foam quality value. Compositions according to the invention may be any suitable foam quality. For some foams, such as nitrogen base foams, the quality can be as high as 90%, or higher. Preferably, the foam quality, or the % gas component volume based upon the total volume of gas and liquid phases, is about 75% or less.

As stated hereinabove, foam compositions of the invention are useful in treating a subterranean formation, including such operations as fracturing subterranean formations, modifying the permeability of subterranean formations, fracture or wellbore cleanup, acid fracturing, gravel packing or sand control, and the like. Another application includes the placement of a chemical plug to isolate zones or to assist an isolating operation. Yet another application involves the use of foam to divert treating chemicals so as to achieve deeper and more uniform invasion into more zones.

It has been unexpectedly discovered that combining a foam extender, with a wellbore treatment composition provides a foam composition which exhibits good foam stability, good useful life, as well as improved viscosity properties. Foam compositions according to the invention include an aqueous medium, a viscosifying agent, which may be a hydratable polymer, crosslinked hydratable polymer, heteropolysaccharide, crosslinked heteropolysaccharide, or viscoelastic surfactant, a foam extender, gas component, and a surfactant to form the foam. The foam extender is a material which effectively stabilizes the foam over operational time periods. The foam extender may also increase the viscosity of the foam, or correspondingly decrease the required level of viscosifying agent. Also, foam compositions according to the invention may be used without an acid additive, particularly in the case of foam compositions incorporating a crosslinker. Foamed fluids without an acid additive means that the base fluid pH does not have to be adjusted (i.e. lowered) to be compatible with the gas component, such as carbon dioxide gas, for example.

Foam compositions according to the invention include a viscosifying agent. Any suitable viscosifying agent may be used. By non-limiting example, suitable viscosifying agents may be from the class of hydratable polymers, viscoelastic surfactants, or even heteropolysaccharides. When the viscosifying agent of foam compositions according to the invention is a hydratable polymer, any suitable hydratable polymer may be used, including, but not necessarily limited to guar, hydroxypropyl guar (HPG), carboxymethyl guar (CMG), carboxymethylhydroxypropyl guar (CMHPG), hydrophobically modified guars and guar derivatives, synthetic and natural water soluble polymers, guar-containing compounds, hydroxyethyl cellulose (HEC), carboxymethylhydroxyethyl cellulose (CMHEC).

While any suitable amount of hydratable polymer may be used, the polymer is preferably incorporated in an amount from about 0.01% to about 10.00% by weight of the composition total liquid phase weight, more preferably from about 0.10% to about 8.0% by weight of the composition total daltons.

When the viscosifying agent of compositions according to the invention incorporate a heteropolysaccharide viscosifying agent, heteropolysaccharides such as xanthan gum and those disclosed in U.S. patent application Ser. No. 11/042,215 may be used. Useful heteropolysaccharides are those represented by the chemical formula:

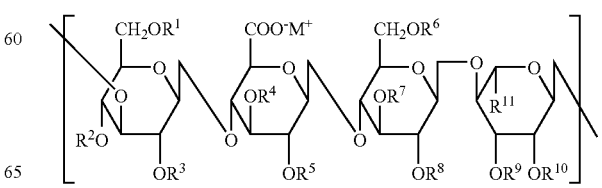

wherein at least three different saccharides are present in the repeating unit, such saccharides including D-glucose, D-glucuronic acid, and either L-rhamnose or L-mannose; $M^+$ is an ionic species; $R^1, R^2, R^3, R^4, R^5, R^6, R^7, R^8, R^9$, and $R^{10}$ are selected from the group consisting of hydrogen, methyl, acetyl, glyceryl, or a saccharide group containing one to three saccharides units; $R^{11}$ is a methyl or methylol group; and the weight average molecular weight (Mw) for the heteropolysaccharide is from about $10^5$ to about $10^7$ daltons. Preferably, the heteropolysaccharide is selected from the group consisting of gellan gum and gellan gum derivatives, welan gum and welan gum derivatives, diutan gum and diutan gum derivatives, rhamsan gum and rhamsan gum derivatives, polysaccharide S-88 and polysaccharide S-88 derivatives as described by Jannson, P. E., N. S. Kumar, and B. Lindberg, Structural studies of a polysaccharide (S-88) elaborated by Pseudomonas ATCC 31554, Carbohydrate Research, 1986, 156: p. 165-172, polysaccharide S-198 and polysaccharide S-198 derivatives as described by Chowdhury, T. A., B. Lindberg, and U. Lindquist, Structural studies of an extracellular polysaccharide (S-198) elaborated by Alcaligenes ATCC 31853, Carbohydrate Research, 1987, 161: p. 127-132, polysaccharide NW11 and polysaccharide NW11 derivatives as described in Pollock, T. J., Sphingan Group of Exopolysaccharides (EPS), in Biopolymers, Vol. 5, E. J. Vandamme, S. DeBaets, and A. Steinbüchel, Editors, 2002, Wiley-VCH Verlag GmbH, p. 239-258, and any mixtures thereof.

While any suitable amount of heteropolysaccharide may be used, heteropolysaccharide is preferably incorporated in an amount from about 0.01% to about 1.00% by weight of the composition total liquid phase weight, more preferably from about 0.10% to about 0.60% by weight of the composition total liquid phase weight. The term liquid phase means all components of the fluid except the gas component.

In some embodiments, the hydratable polymers or heteropolysaccharides used as viscosifying agents may also be crosslinked with a suitable crosslinker. Adding crosslinkers to the fluid may further enhance the viscosity of the foam. Crosslinking consists of the attachment of two or more polymeric chains through the chemical association of such chains to a common element or chemical group. Suitable crosslinkers may comprise a chemical compound containing a polyvalent metal ion such as, but not necessarily limited to, chromium, iron, boron, aluminum, titanium, and zirconium or organic crosslinkers such as, but not necessarily limited to, aldehydes, dialdehydes, phenolic-aldehyde compositions, and multifunctional amines or imines.

When incorporated, the crosslinker may be present in any effective amount. Preferably, the active amount of crosslinker is in the range from about 0.005% to about 0.1% by weight of composition total liquid phase weight, more preferably from about 0.01% to about 0.06% by weight of composition total liquid phase weight.

When hydratable polymers or heteropolysaccharides are incorporated as the viscosifying agents, they may optionally be provided in a slurried form. It is common to employ polymer slurries for ease of mixing in the field. When used in a slurry, the viscosifying agent may be mixed with any suitable liquid carrier. Non-limiting examples of such liquid carriers include diesel oil, mineral oil, glycerol, a mutual solvent (i.e. ethylene glycol monobutyl ether), and the like. A typical slurry is prepared by adding a viscosifying agent blend containing at least 96 wt % polymer with added buffer, organophilic clays and free flow additives to an oil phase such as diesel, mineral oil, or a mutual solvent. The organophilic clays develop viscosity with the liquid phase to suspend the viscosifying agent and enable pumping. The viscosifying agent content of the slurry is typically from 35 to 60 wt %. In other modes, the viscosifying agent can be added on the fly using a dry blend mixer or batch mixed and hydrated prior to pumping the treatment.

Other embodiments of the invention may use a viscoelastic surfactant as a viscosifying agent. Any viscoelastic surfactant capable of providing adequate viscosity properties may be used. Examples of suitable viscoelastic surfactants include cationic, anionic, zwitterionic, amphoteric, and nonionic viscoelastic surfactants, such as those disclosed in U.S. Pat. Nos. 6,435,277 (Qu et al.) and 6,703,352 (Dahayanake et al.). The viscoelastic surfactants, when used alone or in combination, are capable of forming micelles that form a structure in an aqueous environment that contribute to the increased viscosity of the fluid (also referred to as "viscosifying micelles"). Preferred viscoelastic surfactants are (Z)-13 docosenyl-N—N-bis(2-hydroxyethyl)methyl ammonium chloride, oleic acid, erucic amidoalkyl dialkyl betaines, alkyl (C12-16) dialkyl benzyl ammonium chloride and mixtures thereof. The concentration of viscoelastic surfactants incorporated is from about 0.2% to about 15% by weight based upon total fluid weight, preferably from about 1% to about 10% by weight based upon total fluid weight, more preferably from about 1% to about 7% by weight based upon total fluid weight. A brine may also be incorporated in the composition, with a total dissolved solids concentration ranging from about 0.5% to about 25%, more preferably from about 3% to about 25%, and even more preferably from about 5% to about 25%.

The gas component of foams according to the invention may be produced from any suitable gas that forms an energized fluid when introduced into the aqueous medium. See, for example, U.S. Pat. No. 3,937,283 (Blauer et al.). Preferably, the gas component comprises a gas selected from the group consisting of nitrogen, air, carbon dioxide and any mixtures thereof. More preferably the gas component comprises carbon dioxide, in any quality readily available. The gas component assists in the fracturing operation and the well clean-up process. The fluid may contain from about 10% to about 90% volume gas component based upon total fluid volume percent, preferably from about 30% to about 80% volume gas component based upon total fluid volume percent, and more preferably from about 40% to about 75% volume gas component based upon total fluid volume percent.

Foam compositions according to the invention include a foam extender. The foam extender provides foam compositions which exhibit good foam stability at common wellbore treatment/operational periods, as well as improved viscosity values. Preferably, a foam extender may be any additive, chemical compound or chemical blend capable of increasing the viscosity of the foam by at least 10% during at least 10 minutes within 180 minutes after the viscosity measurement is initiated according to the experimental procedure given in the examples below. Such increase in viscosity is relative to the viscosity, measured at the same condition, for foam compositions not incorporating a foam extender. The viscosity evaluation may be conducted using a fully automated high-pressure-high-temperature capillary rheometer, Chandler-Schlumberger Foam Rheometer System, reported in Hutchins, R. D., Miller, M. J., A Circulating Foam Loop for Evaluating Foam at Conditions of Use, SPE paper 80242, SPE International Symposium on Oilfield Chemistry, Houston, Tex., USA 5-7 Feb. 2003. Such increases in viscosity may be observed for any specific treatment/operational temperature or temperature range, and any shear rate.

While any suitable foam extender may be used in compositions according to the invention, examples of suitable foam extenders include, but are not necessarily limited to, sodium bicarbonate, sodium carbonate, sodium sesquicarbonate, potassium carbonate, potassium bicarbonate, potassium peroxycarbonate, ammonium carbonate, ammonium bicarbonate, trisodium phosphate, disodium hydrogen phosphate, sodium pyrophosphate, potassium pyrophosphate, ammonium pyrophosphate, sodium meta phosphate, potassium meta phosphate, ammonium meta phosphate, pyrodisodium phosphate, tripotassium phosphate, dipotassium hydrogen phosphate, diammonium hydrogen phosphate, trilithium phosphate, and any mixtures thereof. The foam extenders may also be polyamines and their chemical derivatives. Examples of useful polyamines used as foam extenders include, but are not limited to, polyoxyalkyleneamines with at least two amino groups in their structure; ethylenepolyamines such as ethylenediamine, diethylenetriamine, triethylenetetramine and tetraethylenepentamine; tertiary polyamines such as pentamethyldiethylenetriamine, tetramethylbis(aminoethyl)ether, pentamethyldipropylenetriamine, tetramethyldipropylenetriamine and tetramethyldipropylenetriamine; substituted propylamines such as dimethylaminopropylamine, aminopropylmorpholine and aminopropylmonomethylethanolamine; piperazines such as N-aminoethylpiperazine and dimethylpiperazine. Preferably, the foam extender is sodium bicarbonate, sodium carbonate, sodium sesquicarbonate, potassium carbonate, potassium bicarbonate, potassium peroxycarbonate, ammonium carbonate, ammonium bicarbonate, tetraethylenepentamine, and any mixtures thereof.

While any suitable amount of foam extender may be incorporated into the foam compositions of the invention, about 0.01 wt % to about 2.0 wt % based on total liquid phase weight is particularly useful. Preferably, the foam extender is incorporated in amounts from about 0.03 wt % to about 1.0 wt % based on total liquid phase weight, and more preferably from about 0.05 wt % to about 0.5 wt % based on total liquid phase weight.

Compositions according to the invention also include a surfactant, or blend of surfactants, for forming the foam. The surfactant facilitates the dispersion of the gas into the base fluid in the form of small bubbles or droplets, and confers stability to the dispersion by retarding the coalescence or recombination of such bubbles or droplets. Foamed and energized fracturing fluids are generally described by their foam quality, i.e. the ratio of gas volume to the foam volume at the measured conditions. Since gas volume is known to decrease substantially with applied pressure and increase moderately with applied temperature, the resulting foam quality will also depend upon the temperature and pressure of the foam composition. If the foam quality is above 52%, the fluid is conventionally called foam, and below 52%, an energized fluid. However, as used herein the term "foam" is defined as any stable mixture of gas and liquid, notwithstanding the foam quality value.

Any surfactant able to aid the dispersion and/or stabilization of the gas component into the base fluid to form a foam that is readily apparent to those skilled in the art may be used. In some embodiments of the invention, the surfactant is an ionic surfactant. Examples of suitable ionic surfactants include, but are not limited to, anionic surfactants such as alkyl carboxylates, alkyl ether carboxylates, alkyl sulfates, alkyl ether sulfates, alkyl sulfonates, α-olefin sulfonates, alkyl phosphates and alkyl ether phosphates. Examples of suitable ionic surfactants also include, but are not limited to, cationic surfactants such as alkyl amines, alkyl diamines, alkyl ether amines, alkyl quaternary ammonium, dialkyl quaternary ammonium and ester quaternary ammonium compounds. Examples of suitable ionic surfactants also include, but are not limited to, surfactants that are usually regarded as zwitterionic surfactants and in some cases as amphoteric surfactants such as alkyl betaines, alkyl amido betaines, alkyl imidazolines, alkyl amine oxides and alkyl quaternary ammonium carboxylates. The amphoteric surfactant is a class of surfactant that has both a positively charged moiety and a negatively charged moiety over a certain pH range (e.g. typically slightly acidic), only a negatively charged moiety over a certain pH range (e.g. typically slightly alkaline) and only a positively charged moiety at a different pH range (e.g. typically moderately acidic), while a zwitterionic surfactant has a permanent positively charged moiety in the molecule regardless of pH and a negatively charged moiety at alkaline pH. In some embodiments of the invention, the surfactant is a cationic, zwitterionic or amphoteric surfactant containing an amine group or a quaternary ammonium group in its chemical structure ("amine functional surfactant"). A particularly useful surfactant is the amphoteric alkyl amine contained in the surfactant solution Aquat 944® (available from Baker Petrolite of 12645 W. Airport Blvd, Sugar Land, 77478 USA). In other embodiments of the invention, the surfactant is a blend of two or more of the surfactants described above, or a blend of any of the surfactant or surfactants described above with one or more nonionic surfactants. Examples of suitable nonionic surfactants include, but are not limited to, alkyl alcohol ethoxylates, alkyl phenol ethoxylates, alkyl acid ethoxylates, alkyl amine ethoxylates, sorbitan alkanoates and ethoxylated sorbitan alkanoates. Any effective amount of surfactant or blend of surfactants may be used in aqueous energized fluids of the invention. Preferably the fluids incorporate the surfactant or blend of surfactants, for purposes of forming the foam, in an amount of about 0.02 wt % to about 5 wt % of total liquid phase weight, and more preferably from about 0.05 wt % to about 2 wt % of total liquid phase weight. When the viscosifying agent is a viscoelastic surfactant, a separate surfactant for foam creation is generally not required.

Foam compositions according to the invention have viscosity properties adequate to stimulate subterranean formations, typically at least about 20 mPa-s @ 100 s$^{-1}$, at treatment temperature. Preferably, the compositions have a viscosity from about 20 mPa-s @ 100 s$^{-1}$ to about 500 mPa-s @ 100 s$^{-1}$, more preferably from about 100 mPa-s @ 100 s$^{-1}$ to about 300 mPa-s @ 100 s$^{-1}$, at treatment temperature.

The compositions of the invention may further comprise one or more members from the group of organic and inorganic salts. Typical concentration for these groups of additives is from zero percent to about 20% by weight of fluid composition, more typically from zero percent to about 10% by weight and even more typically from zero percent to about 5% by weight.

The inorganic salts that are particularly suitable for use in the compositions include water-soluble potassium, sodium, and ammonium salts, such as, by nonlimiting example, potassium chloride, ammonium chloride, and the like. Additionally, calcium chloride, calcium bromide and zinc halide salts may also be used. The inorganic salts may aid in the development of increased viscosity that is characteristic of preferred fluids. Further, the inorganic salt may assist in maintaining the stability of a geologic formation to which the fluid is exposed. Formation stability and in particular clay stability (by inhibiting hydration of the clay) is achieved at a concentration level of a few percent by weight and as such the density of fluid is not significantly altered by the presence of the inorganic salt unless fluid density becomes an important consideration, at which point, heavier inorganic salts may be used. The inorganic salt will typically be present in the viscoelastic fluid at a weight concentration of from about 0.01% to about 30%, more typically from about 0.1% to about 10%, and even more typically from about 0.1% to about 8%. Organic salts, e.g. sodium diacetate, trimethylammonium hydrochloride and tetramethylammonium chloride, may also be used in addition to, or in place of, the inorganic salts.

Embodiments of the invention may also comprise an organoamino compound, alcohol or oxygen scavenging chemical for stabilizing the fluid at elevated temperatures. Examples of suitable organoamino compounds include, but are not necessarily limited to, triethanolamine, diethanolamine, monoethanolamine, dimethylethanolamine and the like, or any mixtures thereof. When organoamino compounds are used in fluids of the invention, they are incorporated at an amount from about 0.01 wt % to about 2.0 wt % based on total liquid phase weight. Preferably, when used, the organoamino compound is incorporated at an amount from about 0.05 wt % to about 1.0 wt % based on total liquid phase weight. Suitable oxygen scavenging chemicals include sodium, ammonium or potassium sulfites and thiosulfates. Suitable alcohols are described immediately below.

A sufficient quantity of a water miscible alcohol may be employed to further enhance viscoelastic properties. Preferably the alcohol is a $C_1$ to $C_{12}$ aliphatic alcohol. Examples of suitable alcohols include, but are not limited to, methanol, iso-propanol, iso-butanol, ethylene glycol, propylene glycol, and the like. Iso-propanol and methanol are preferred alcohols.

When used as a fracturing fluid, embodiments of the invention can also comprise proppant particles that are substantially insoluble in the fluids of the formation. Proppant particles carried by the fracturing fluid remain in the fracture created, thus propping open the fracture when the fracturing pressure is released and the well is put into production. Suitable proppant materials include sand, but are not limited to, walnut shells, sintered bauxite, glass beads, ceramic beads, or similar materials. Mixtures of suitable proppants can be used. If sand is used, it will typically be from about 12 to about 100 U.S. Standard Mesh in size. The concentration of proppant in the fracturing fluid can be any concentration known in the art, and will typically be in the range of from about 0.05 to about 3 kilograms of proppant added per liter of clean fluid.

Fracturing foam compositions based on the invention can also comprise a breaker. The purpose of this component is to "break" or diminish the viscosity of the fracturing fluid so that this fluid is more easily recovered from the fracture during clean-up. Exemplary breakers include citric acid as described in U.S. Pat. No. 6,881,709 (Nelson et al.), soluble persulfates, bromates, chlorites, hypochlorites, peroxides and free radical generators.

Compositions of the invention may further contain one or more additives such as breaker aids, organophilic clays, clay stabilizers, free flow additives, friction reducers, scale inhibitors, corrosion inhibitors, fluid-loss additives, bactericides, biocides, enzymes, chelating agents, leak-off control agents, and the like. Also optionally, the fracturing fluid can contain materials designed to limit proppant flowback after the fracturing operation is complete by forming a porous pack in the fracture zone. Such materials, herein "proppant flowback inhibitors," can be any known in the art, such as those available from Schlumberger under the trade name PROPNET®. Relative permeability modifiers, whether active or possessing delayed activity can be included in the formulation to combat formation water incursion.

A fiber component may be included in the fluids of the invention to achieve a variety of properties including improving particle suspension, particle transport capabilities, and gas phase stability. Fibers used may be hydrophilic or hydrophobic in nature, but hydrophilic fibers are preferred. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used in fluids of the invention, the fiber component may be included at concentrations from about 1 to about 15 grams per liter of the liquid phase of the fluid, preferably the concentration of fibers are from about 2 to about 12 grams per liter of liquid, and more preferably from about 2 to about 10 grams per liter of liquid.

Another embodiment of the invention includes the use of fluids of the invention for hydraulically fracturing a subterranean formation. Techniques for hydraulically fracturing a subterranean formation will be known to persons of ordinary skill in the art, and will involve pumping the fracturing fluid into the borehole and out into the surrounding formation. The fluid pressure is above the minimum in situ rock stress, thus creating or extending fractures in the formation. See Stimulation Engineering Handbook, John W. Ely, Pennwell Publishing Co., Tulsa, Okla. (1994), U.S. Pat. No. 5,551,516 (Normal et al.), "Oilfield Applications", Encyclopedia of Polymer Science and Engineering, vol. 10, pp. 328-366 (John Wiley & Sons, Inc. New York, N.Y., 1987) and references cited therein.

Yet another embodiment of the invention includes the use of fluids based on the invention for cleanup. The term "cleanup" or "fracture cleanup" refers to the process of removing the fracture fluid (without the proppant) from the fracture and wellbore after the fracturing process has been completed. Techniques for promoting fracture cleanup traditionally involve reducing the viscosity of the fracture fluid as much as practical so that it will more readily flow back toward the wellbore. While breakers are typically used in cleanup of energized fluids, the fluids of the invention are inherently effective for use in cleanup operations, with or without a breaker.

In another embodiment, the present invention relates to use of fluids based on the invention for gravel packing a wellbore. As a gravel packing fluid, it preferably comprises gravel or sand and other optional additives such as filter cake clean up reagents such as enzymes, chelating agents, corrosion inhibitors, scale inhibitors, biocides, and leak-off control agents, among others. For this application, suitable gravel or sand includes those typically having a mesh size between 8 and 70 U.S. Standard Sieve Series mesh.

In a further embodiment, the present invention is used as a wellbore cleanup fluid for removing solids from the wellbore. Typical solids include produced silt and sand, drill cuttings, metal or cement cuttings from milling or drilling within an existing wellbore and sand or calcium carbonate particles introduced into the wellbore to temporarily plug a producing zone.

The following examples are presented to illustrate the preparation and properties of foams comprising a foam extender, and should not be construed to limit the scope of the invention, unless otherwise expressly indicated in the appended claims. All percentages, concentrations, ratios, parts, etc. are by weight unless otherwise noted or apparent from the context of their use.

EXAMPLES

The following examples illustrate the compositions and methods of the present invention, as described in the preferred embodiments.

Foam fluid viscosity measurements made for examples 1-20 below were performed with a fully automated high-pressure-high-temperature capillary rheometer, Chandler-Schlumberger Foam Rheometer System. Further details on the operation of the equipment are reported in Hutchins, R. D. and Miller, M. J., A Circulating Foam Loop for Evaluating Foam at Conditions of Use, SPE paper 80242, SPE International Symposium on Oilfield Chemistry, Houston, Tex., USA 5-7 Feb. 2003. The equipment was calibrated in compliance with ISO-9001 standards. The rheometer includes a 322-mL closed flow loop in which aqueous solution and gas are injected to achieve a desired liquid/gas composition of the foam. The equipment is provided with a mass flowmeter, Micro Motion ELITE CMF010 sensor with model 2700 transmitter, both available from Emerson Process Management of 7070 Winchester Circle, Boulder, Colo., USA 80301, that determines flow rate and density of the fluid. The measured flow rate is used to determine the working speed of a positive displacement pump, Series 220 available from Micropump, Inc of 1402 NE 136th Avenue, Vancouver, Wash., USA 98684-0818, that was needed to achieve the shear rate indicated by the user through a software interface, Chandler FoamLoop DACS v.1.12.1, available from Chandler Engineering of 2001 Indianwood Avenue, Broken Arrow, Okla., USA 74012-1163. The pressure drop along a 5.26 meter long 6.4 millimeter outside diameter stainless steel tubing was measured with a pressure transducer, a Rosemount model 3051, available from Emerson Process Management, to determine the apparent viscosity. The software referred to above calculated shear rate and apparent viscosity using equations based on fluid mechanic principles, see Hutchins, R. D. and Miller, M. J., above. Temperature was set through the software, which controls the operation of an oven, model Hewlett Packard HP 6890 Series GC System from Agilent Technologies of Box 42816, Houston, Tex., USA 77036, in which most of the tubing is enclosed. Temperature was uniformly maintained in sections of the tubing outside of the oven with an electrical heat tracing system model TBX4LC-HPC available from Thermon of 100 Thermon Dr., San Marcos, Tex., USA 78666. The gas/liquid composition of the energized fluid was verified through the measured density and published equations of state. Experiments were performed at pressures from 8.3 to 11.7 MPa and at a shear rate of 100 s$^{-1}$.

A sequential method was used to generate the foams used in the examples; aqueous phase was loaded to 6.9 MPa and then the gas phase was loaded as the aqueous phase was withdrawn simultaneously until the measured density would reach a desired value. Temperature was then adjusted to a target value while the foam was circulated and viscosity was measured as described above.

Examples 1-6

Examples 1 through 6 illustrate the foam viscosity enhancing effects of incorporating foam extenders into carbon dioxide based foams. To prepare examples 1 through 6, a common mixture was used which contained materials mixed at a rate of 3785 liters of deionized water, 13.64 kg carboxymethylhydroxypropyl guar (CMHPG), 1.89 liters of a 1:1 sodium diacetate/water solution, 37.85 liters AQUET™ 944 amphoteric alkyl amine solution (available from Baker Petrolite, Sugar Land, Tex. 77478), and 7.57 liters of a 1:1 tetramethyl ammonium chloride/water solution clay stabilizer. Examples 1 through 6 were then prepared by mixing the following ingredients at the specified rates in Table 1:

TABLE 1

| Ingredient | Ex. 1 | Ex. 2 | Ex. 3 | Ex. 4 | Ex. 5 | Ex. 6 |
|---|---|---|---|---|---|---|
| Common Mixture (liter) | 3785 | 3785 | 3785 | 3785 | 3785 | 3785 |
| Foam Extender: | | | | | | |
| Sodium Carbonate ($Na_2CO_3$) | — | 4.5 kg | — | — | — | — |
| Potassium Carbonate ($K_2CO_3$) | — | — | 5.9 kg | — | — | — |
| Sodium Phosphate ($Na_3PO_4 \cdot 12H_2O$) | — | — | — | 3.4 kg | — | — |
| Sodium Carbonate/ Bicarbonate Mixture ($Na_2CO_3 \cdot NaHCO_3 \cdot 2H_2O$) | — | — | — | — | 4.8 kg | — |
| Sodium Bicarbonate ($NaHCO_3$) | — | — | — | — | — | 3.4 kg |

Example 1 is a control example without an addition of foam extender, while examples 2 through 6 include a foam extender. The carbon dioxide foams were then formed at a foam quality of 70, or 70% by volume gas component, based upon the total volume of liquid and gas component, as described above. The foams were evaluated at about 93° C. and pressures from 8.3 to 11.7 MPa.

Figure 2:
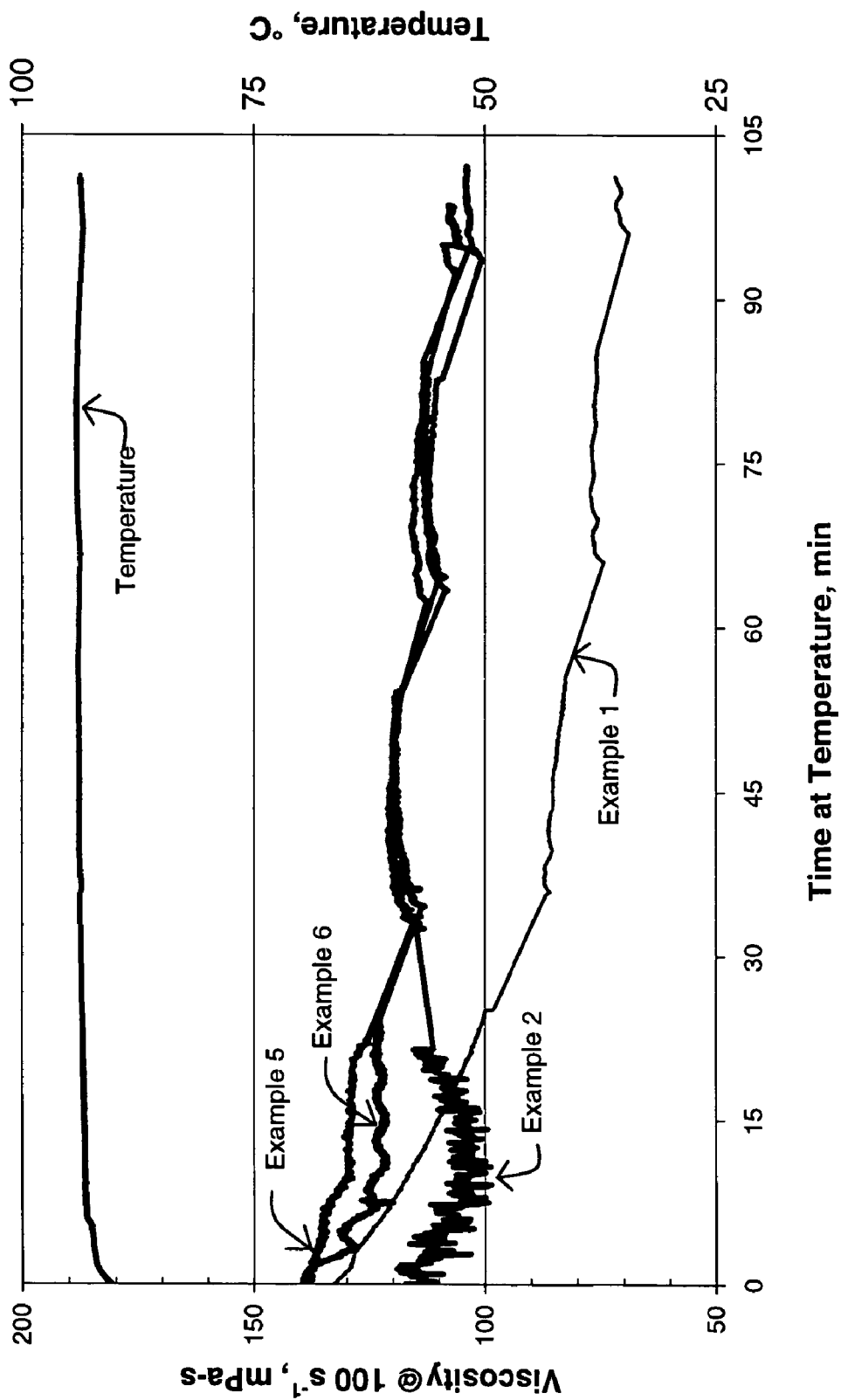

FIGS. 1 and 2, by graphical representation, both illustrate the viscosity enhancing benefit of adding foam extenders. As compared with example 1, clearly the addition of carbonates and phosphates improved the foam viscosity as seen by the top cluster of curves on the graphs in FIGS. 1 and 2. All of the carbonate and/or bicarbonate foam extenders, examples 2, 3, 5 and 6, show similar results with a viscosity enhancement of about at least 40 mPa-s @ 100 s$^{-1}$. The phosphate foam extender, example 4, yielded about at least 25 mPa-s @ 100 s$^{-1}$ viscosity enhancement. Further, for examples 2 through 6, the viscosity properties are more stable over time as compared with example 1.

Examples 7-13

Table 2 compiles the viscosity gain results for the different viscosifying agent systems for examples with an added foam extender, as compared with no foam extender. The viscosity gain was determined from the viscosity profile obtained using the viscosity measurements described above. The viscosity gains reported were calculated from the viscosities that were measured 75 minutes after the beginning of the tests. All of the foams described in the table were prepared with the specified viscosifying agent, 4.5 kg sodium carbonate foam extender, 37.8 liters of a 30:15:55 volume mixture of amphoteric alkyl amine/isopropanol/water, and 7.57 liters of a 1:1 tetramethyl ammonium chloride/water solution clay stabilizer per 3785 liters of fluid. The mixtures had a quality of 70% by volume $CO_2$, and the foams were prepared as described in examples 1-6.

TABLE 2

| | Ex. 7 | Ex. 8 | Ex. 9 | Ex. 10 | Ex. 11 | Ex. 12 | Ex. 13 |
|---|---|---|---|---|---|---|---|
| Viscosifying Agent | Guar | CMG | HPG | CMHPG | CMHPG | CMHPG | CMHPG |
| Viscosifying Agent Concentration (g/liter) | 3.6 | 3.6 | 3.6 | 1.8 | 2.4 | 3.6 | 4.8 |
| Viscosity Measurement Temperature (° C.) | 93 | 93 | 93 | 79 | 93 | 93 | 102 |
| Viscosity Gain vs No Foam Extender (mPa-s @ 100 s − 1) | 25 | 20 | 10 | 10 | 25 | 40 | 20 |

As Table 2 illustrates, significant viscosity gains are realized by addition of a foam extender. This also enables the use of a decreased level of viscosifying agent to achieve similar fluid viscosities when a foam extender is incorporated.

Examples 14-16

Examples 14 through 16 illustrate the foam viscosity enhancing effects of incorporating foam extenders into nitrogen based foams, as well as how the viscosifying agent level may be decreased. To prepare examples 14 through 16, a common mixture was used which contained materials mixed at a rate of 3785 liters of deionized water, 1.89 liters of a 1:1 sodium diacetate/water solution, 37.8 liters of a 6:3:11 volume mixture of amphoteric alkyl amine/isopropanol/water, and 7.57 liters of a 1:1 tetramethyl ammonium chloride/water solution clay stabilizer. Examples 14 through 16 were then prepared by mixing the following ingredients at the specified rates in Table 3:

TABLE 3

| Ingredient | Ex. 14 | Ex. 15 | Ex. 16 |
|---|---|---|---|
| Common Mixture (liter) | 3785 | 3785 | 3785 |
| Carboxymethylhydroxypropyl guar | 13.6 kg | 18.2 kg | 13.6 kg |
| Sodium Carbonate Foam Extender ($Na_2CO_3$) | — | — | 4.5 kg |

Example 14 was a control example without addition of foam extender, while example 16 included a foam extender. While example 15 did not include foam extender, a higher level of CMHPG viscosifying agent was incorporated as compared with control example 14. The nitrogen foams were formed at a foam quality of 70, or 70% by volume of gas component, based upon the total volume of liquid and gas component, as described above. The foams were evaluated at about 93° C. and pressures from 8.3 to 11.7 MPa.

Figure 3:
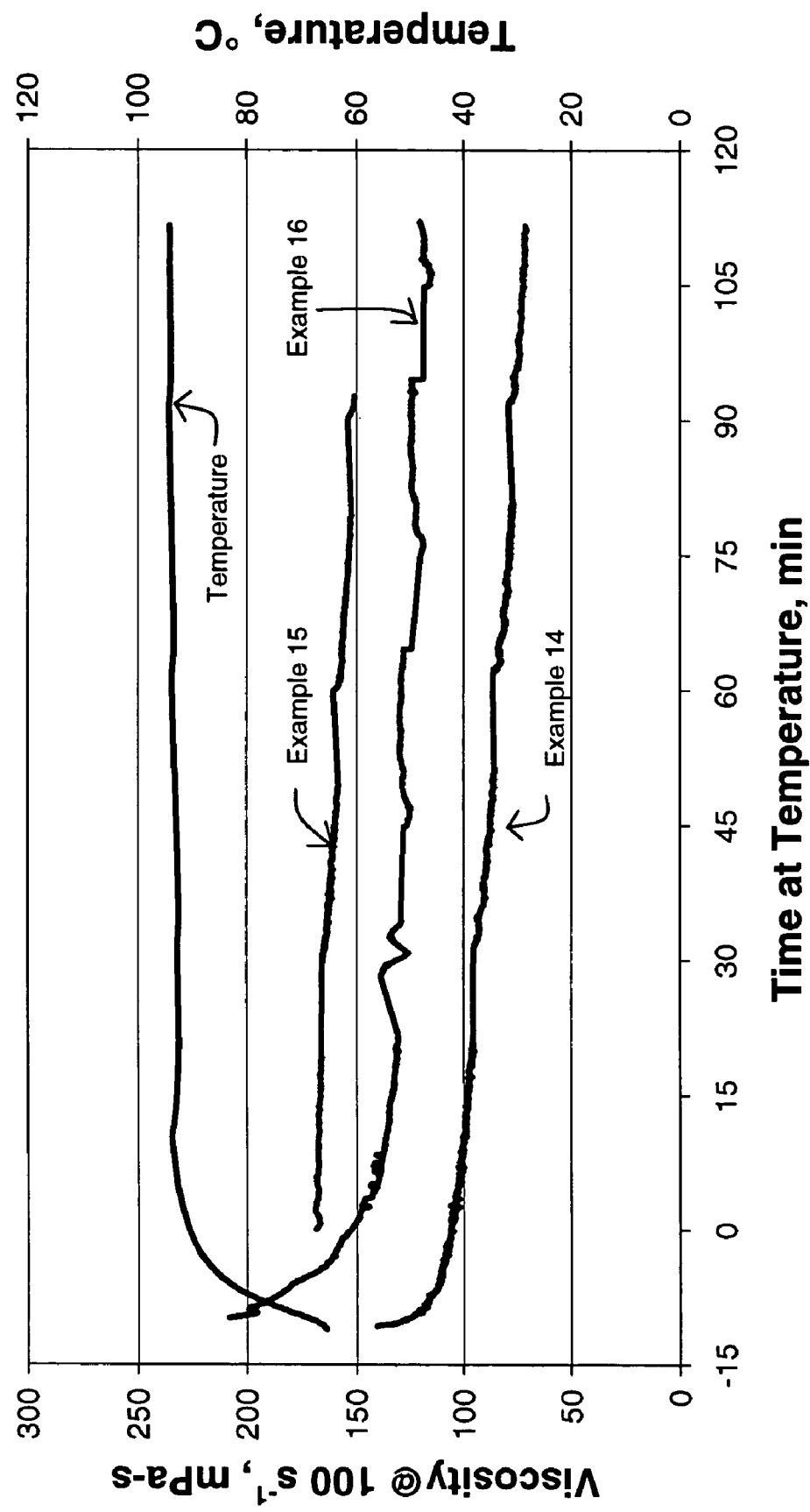
FIG. 3 by graphical representation illustrates the viscosity enhancing benefit of adding extenders to nitrogen based foams.

FIG. 3 illustrates the viscosity enhancing benefit of adding extenders to nitrogen based foams. As compared with example 14, clearly the extender enhanced the foam viscosity as shown in example 16. Comparing example 15 with example 16, the extender may enhance the foam viscosity properties to the point that viscosity properties approach those of foam containing higher levels of viscosifying agent without foam extenders.

Examples 17-20

For following examples 17 through 20, viscosity measurements for the carbon dioxide/water-based fluid mixture were performed with a fully automated high-pressure-high-temperature capillary rheometer (Chandler-Schlumberger), as discussed hereinabove. In all cases, experiments were performed at 8.7 MPa and at a shear rate of 100 s$^{-1}$. The reported viscosity data correspond to the viscosities that were recorded twenty (20) minutes after the foam reached the desired temperature.

Figure 4:
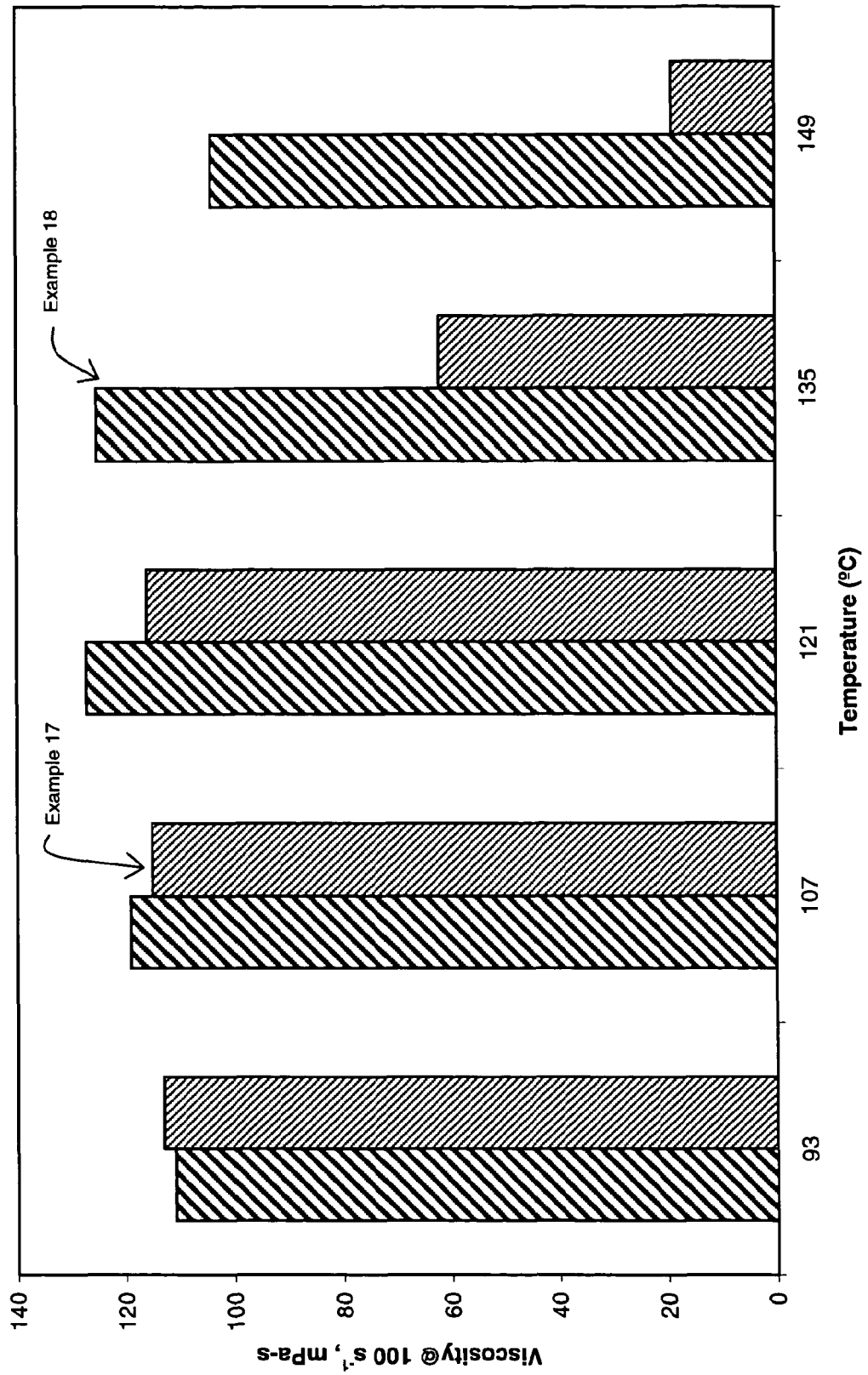
FIG. 4 by graphical representation further illustrates the viscosity enhancing benefit of adding foam extenders to carbon dioxide foams incorporating polysaccharide viscosifying agents.

Examples 17 and 18 in conjunction with Table 4 and FIG. 4 illustrate the viscosity enhancement effect when a polyamine is incorporated as a foam extender. The use of a foam extender also improves the practical lifetime of treatment fluids. Table 4 lists foam compositions where example 17 contains no foam extender and example 18 contains a polyamine foam extender (tetraethylenepentamine in this case). All numbers are given in percent weight based upon total liquid weight.

TABLE 4

| Ingredient | Ex. 17 | Ex. 18 |
|---|---|---|
| Water | 99.4% by wt | 98.9% by wt |
| Diutan Gum Viscosifying Agent | 0.3 | 0.3 |
| Tetraethylenepentamine Foam Extender | — | 0.5 |
| AQUET ™ 944 amphoteric alkyl amine solution | 0.3 | 0.3 |
| Viscosity Measurements at Temperature and $CO_2$ vol % in mPa-s @ 100 s$^{-1}$: | | |
| 93° C. @ 61% $CO_2$ vol % | 113 | 111 |
| 107° C. @ 64% $CO_2$ vol % | 115 | 129 |
| 121° C. @ 67% $CO_2$ vol % | 116 | 127 |
| 135° C. @ 70% $CO_2$ vol % | 62 | 125 |
| 149° C. @ 72% $CO_2$ vol % | 19 | 104 |

Table 4 and FIG. 4 show viscosity measurements for foam mixtures of carbon dioxide and the fluids (example 17 and 18) described above at different temperatures and concentrations of carbon dioxide in the foam mixture. It is also illustrated that the foam extender did have a significant effect on the viscosity of these foam compositions, especially the viscosity of mixtures at 121° C. and above, where viscosity was significantly smaller for the mixtures not containing tetraethylenepentamine as foam extender. This effect became more pronounced as the temperature of the mixture was even further increased. Therefore, the usage of tetraethylenepentamine foam extender retarded the degradation of, or stabilized, the viscosity properties of the mixture at elevated temperatures.

Figure 5:
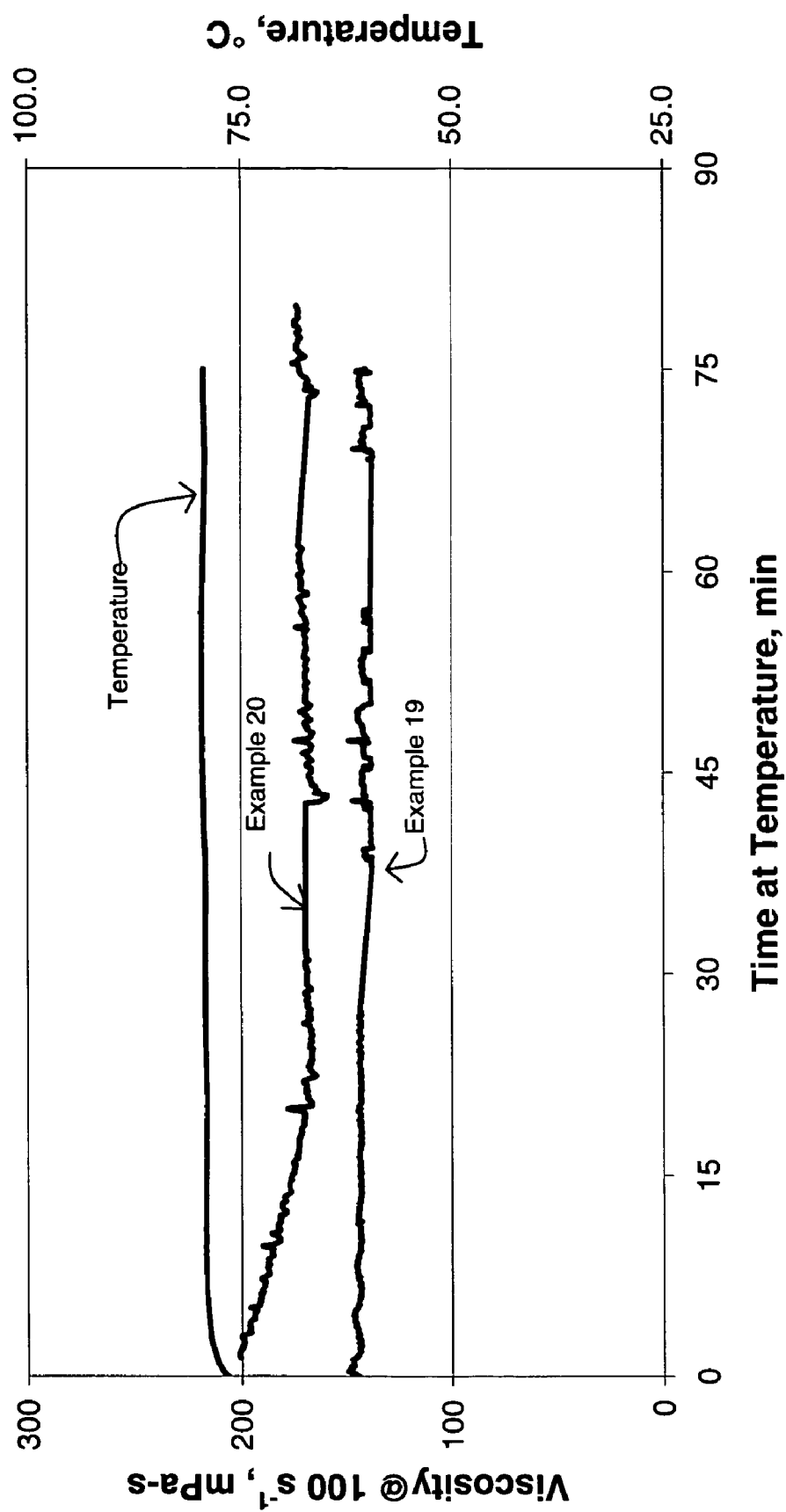
FIG. 5 illustrates viscosity enhancements for foam mixtures of carbon dioxide gas at 70% volume percent, viscoelastic surfactant viscosifying agent, and a sodium carbonate foam extender.

FIG. 5 and Table 5 illustrate viscosity measurements for foam mixtures of carbon dioxide gas at 70% volume percent, viscoelastic surfactant (VES) viscosifying agent, and sodium carbonate foam extender. The foam compositions, examples 19 and 20, are presented in Table 5 below. FIG. 5 shows the viscosity enhancing benefit of adding extenders to VES/carbon dioxide based foams. As compared with example 19, clearly the extender enhanced the foam viscosity as shown in example 20.

TABLE 5

| Ingredient | Ex. 19 | Ex. 20 |
|---|---|---|
| Water | 970 liters | 970 liters |
| VES Viscosifying agent (Z)-13 docosenyl-N-N-bis (2-hydroxyethyl) methyl ammonium chloride, 75% aqueous solution | 30 liters | 30 liters |
| Sodium Carbonate Foam Extender (Na$_2$CO$_3$) | — | 1.16 kilograms |
| Potassium Chloride | 38.8 kilograms | 38.8 kilograms |
| Viscosity Measurements at 70° C. @ 100 s$^{-1}$ | 140 mPa-s | 175 mPa-s |

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method of treating a formation penetrated by a wellbore, the method comprising:
   providing a fluid composition comprising an aqueous medium, a foam extender, and a surfactant, and viscosifying agent;
   providing a gas component; and,
   injecting into the wellbore, the fluid concomitantly with the gas component;
   wherein the foam extender provides at least about an average 10% increase in measured viscosity values over at least a 10 minute period as measured over about a 180 minute evaluation interval, and
   wherein the foam extender is selected from the group consisting of trisodium phosphate, disodium hydrogen phosphate, sodium pyrophosphate, potassium pyrophosphate, ammonium pyrophosphate, sodium meta phosphate, potassium meta phosphate, ammonium meta phosphate, pyrodisodium phosphate, tripotassium phosphate, dipotassium hydrogen phosphate, diammonium hydrogen phosphate and trilithium phosphate.

2. The method according to claim 1 wherein the viscosifying agent is a polymer selected from the group consisting of guar, hydroxypropyl guar, carboxymethyl guar, carboxymethylhydroxypropyl guar, hydrophobically modified guars and guar derivatives, synthetic water soluble polymers, natural water soluble polymers, guar-containing compounds, hydroxyethyl cellulose, and carboxymethylhydroxyethyl cellulose; and the weight average molecular weight (Mw) for the polymer is from about $10^5$ to about $2\times10^7$ daltons.

3. The method according to claim 1, wherein the viscosifying agent is a hydratable polymer incorporated in an amount from about 0.01% to about 10.00% by weight of the composition total liquid phase weight.

4. The method according to claim 1 wherein the viscosifying agent is a heteropolysaccharide selected from the group consisting of gellan gum and gellan gum derivatives, welan gum and welan gum derivatives, diutan gum and diutan gum derivatives, rhamsan gum and rhamsan gum derivatives, polysaccharide S-88 and polysaccharide S-88 derivatives, polysaccharide S-198 and polysaccharide S-198 derivatives, polysaccharide NW11 and polysaccharide NW11 derivatives, and any mixtures thereof, wherein the heteropolysaccharide is incorporated in an amount from about 0.01% to about 1.00% by weight of total liquid phase weight.

5. The method according to claim 1 wherein the viscosifying agent is a cationic, anionic, zwitterionic, amphoteric, or nonionic viscoelastic surfactant, or any combination thereof, and the viscosifying agent is incorporated in an amount from about 0.2% to about 15% by weight based upon total fluid weight.

6. The method according to claim 1 wherein the fluid composition further comprises a clay stabilizer incorporated in an amount of from about 0.01 wt % to about 12.0 wt % of the composition total liquid phase weight, and the clay stabilizer is selected from the group consisting of tetramethyl ammonium chloride, potassium chloride, and any mixture thereof.

7. The method according to claim 1 wherein the gas component comprises a gas selected from the group consisting of carbon dioxide, air, nitrogen, and any mixtures thereof, the gas component comprising from about 10% to about 90% of the composition total volume percent measured at downhole conditions of temperature and pressure.

8. The method according to claim 1 wherein the gas component is carbon dioxide comprising 30% to about 80% of the composition total volume percent.

9. The method according to claim 1 wherein the fluid composition further comprises a proppant.

10. The method according to claim 9 wherein the proppant is selected from the group consisting of sand, walnut shells, sintered bauxite, glass beads, ceramic materials, naturally occurring materials, and any mixtures thereof.

11. The method according to claim 1 wherein the fluid composition further comprises a crosslinker containing a metal ion selected from the group consisting of chromium, iron, boron, titanium, aluminum, and zirconium or containing an aldehyde, dialdehyde, phenolic-aldehyde composition, multifunctional amine, or a multifunctional imine.

12. The method according to claim 11 wherein the fluid composition is acid additive free.

13. The method according to claim 1 wherein the fluid composition further comprises a breaker.

14. The method according to claim 1 wherein the viscosity of the mixture of the fluid composition and the gas component is from about 20 mPa-s @ 100 s$^{-1}$ to about 500 mPa-s @ 100 s$^{-1}$ at treatment temperature.

15. The method according to claim 1 wherein the formation treatment comprises fracturing.

16. The method according to claim 1 wherein the formation treatment comprises gravel packing.

17. A method of treating a formation penetrated by a wellbore, the method comprising:
   introducing into the wellbore a foam composition comprising:
      an aqueous medium,
      a foam extender,
      a gas component selected from the group consisting of nitrogen, carbon dioxide, and any mixtures thereof,
      a viscoelastic surfactant viscosifying agent, and
      a clay stabilizer,
   wherein the viscoelastic surfactant is incorporated in an amount from about 1.0% to 10% based on the composition of total composition weight, wherein the viscosity of the foam composition is from about 20 mPa-s @ 100 s$^{-1}$ to about 500 mPa-s @ 100 s$^{-1}$,
   wherein the foam extender provides at least about an average 10% increase in measured viscosity values over at least a 10 minute period as measured over about a 180 minute evaluation interval, and wherein the foam extender is selected from the group consisting of trisodium phosphate, disodium hydrogen phosphate, sodium pyrophosphate, potassium pyrophosphate, ammonium pyrophosphate, sodium meta phosphate, potassium meta phosphate, ammonium meta phosphate, pyrodisodium phosphate, tripotassium phosphate, dipotassium hydrogen phosphate, diammonium hydrogen phosphate and trilithium phosphate.

18. A method of treating a formation penetrated by a wellbore, the method comprising:

introducing into the wellbore a fracturing foam composition comprising:

an aqueous medium, a gas component incorporated in an amount from about 40% to about 75% of the composition total fluid volume percent, a hydratable polymer incorporated in an amount from about 0.10% to about 0.50% by weight of the composition total liquid phase weight, a foaming agent wherein the foaming agent is incorporated in amount of about 0.02 wt % to about 5 wt % of total liquid phase weight, and an effective amount of a foam extending agent, wherein the viscosity of the foam composition is from about 20 mPa-s @ 100 s$^{-1}$ to about 500 mPa-s @ 100 s$^{-1}$, wherein the foam extender provides at least about an average 10% increase in measured viscosity values over at least a 10 minute period as measured over about a 180 minute evaluation interval, and wherein the foam extender is selected from the group consisting of trisodium phosphate, disodium hydrogen phosphate, sodium pyrophosphate, potassium pyrophosphate, ammonium pyrophosphate, sodium meta phosphate, potassium meta phosphate, ammonium meta phosphate, pyrodisodium phosphate, tripotassium phosphate, dipotassium hydrogen phosphate, diammonium hydrogen phosphate and trilithium phosphate.

* * * * *